US011223616B2

(12) United States Patent
Grødum et al.

(10) Patent No.: US 11,223,616 B2
(45) Date of Patent: Jan. 11, 2022

(54) ULTRASOUND ASSISTED DEVICE ACTIVATION

(71) Applicant: Cisco Technology, Inc., San Jose, CA (US)

(72) Inventors: Nicolai Grødum, Oslo (NO); Bjørn Kristian Nordlund, Nesoddtangen (NO); Magnus Aaen Holst, Drammen (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 181 days.

(21) Appl. No.: 16/534,213

(22) Filed: Aug. 7, 2019

(65) Prior Publication Data

US 2021/0044580 A1 Feb. 11, 2021

(51) Int. Cl.
*H04L 29/06* (2006.01)
*H04L 9/08* (2006.01)
*H04W 12/04* (2021.01)
*H04W 12/06* (2021.01)

(52) U.S. Cl.
CPC ........ *H04L 63/0838* (2013.01); *H04L 9/0863* (2013.01); *H04L 63/0823* (2013.01); *H04W 12/04* (2013.01); *H04W 12/068* (2021.01)

(58) Field of Classification Search
CPC ............. H04L 63/0838; H04L 63/0823; H04L 9/0863; H04W 12/068; H04W 12/04
See application file for complete search history.

(56) References Cited

U.S. PATENT DOCUMENTS

| 9,100,392 B2 | 9/2015 | Hubner et al. |
| 9,210,192 B1 | 12/2015 | Kim et al. |
| 9,449,160 B1* | 9/2016 | Czeskis ................... G06F 3/167 |
| 9,621,645 B2 | 4/2017 | Smus et al. |
| 9,681,468 B2 | 6/2017 | Lee et al. |
| 2008/0141025 A1* | 6/2008 | Noble .................. H04L 63/0407 713/155 |
| 2008/0235511 A1* | 9/2008 | O'Brien ................ H04L 9/0844 713/171 |
| 2016/0134599 A1* | 5/2016 | Ross ....................... H04L 63/08 713/168 |
| 2016/0275461 A1* | 9/2016 | Sprague ................ H04L 9/3234 |

(Continued)

OTHER PUBLICATIONS

Mayrhofer, Rene et al., "On the Security of Ultrasound as Out-of-band Channel", Conference Paper, Jan. 2007, DOI: 10.1109/IPDPS. 2007.370618 • Source: DBLP, ResearchGate, 7 pages.

(Continued)

*Primary Examiner* — Vance M Little
(74) *Attorney, Agent, or Firm* — Edell, Shapiro & Finnan, LLC (57) ABSTRACT

An onboarding server uses an ultrasound token to securely onboard a new device to an organizational structure. The onboarding server obtains a registration from the new device and provides the new device with an ultrasound token. The onboarding server also obtains a notification from a user device that detected the ultrasound token broadcast from the new device. The onboarding server determines a device identity for the new device and provides cryptographic information to the new device. The cryptographic information enables the new device to connect to an organizational structure with the device identity.

20 Claims, 7 Drawing Sheets

(56) References Cited

U.S. PATENT DOCUMENTS

| | | |
|---|---|---|
| 2017/0374069 A1 | 12/2017 | Hardy et al. |
| 2018/0040091 A1* | 2/2018 | Kusens ................ G06Q 50/265 |
| 2018/0359106 A1 | 12/2018 | Moorefield, Jr. et al. |
| 2019/0058586 A1 | 2/2019 | Kumar et al. |
| 2019/0089693 A1 | 3/2019 | Ding et al. |

OTHER PUBLICATIONS

Cisco, "Plug and Play Connect", 4 pages, downloaded from Internet Jul. 3, 2019, https://www.cisco.com/c/en/us/buy/smart-accounts/plug-play-connect.html, 4 pages.

* cited by examiner

ULTRASOUND ASSISTED DEVICE ACTIVATION

TECHNICAL FIELD

The present disclosure relates to onboarding computing devices into an organizational structure.

BACKGROUND

Provisioning computing devices (e.g., telepresence endpoints, network devices, Internet of Things (IoT) devices, etc.) provides the computing devices with a device identity and credentials to communicate with other services within an organizational structure. The computing devices typically require a secret to authenticate into the services in the organization. An administrator may generate an activation code that is manually entered into each computing device, but this process is cumbersome and error-prone. Additionally, some devices may have resource constraints (e.g., lack of a sophisticated display or input device) that further hinders the process of manually entering an activation code.

DESCRIPTION OF EXAMPLE EMBODIMENTS

Overview

A method is provided for an onboarding server to onboard a new device to an organizational structure. The method includes an onboarding server obtaining a registration from the new device and providing the new device with an ultrasound token. The method also includes obtaining a notification from a user device that detected the ultrasound token broadcast from the new device. The method further includes determining a device identity for the new device and providing cryptographic information to the new device. The cryptographic information enables the new device to connect to an organizational structure with the device identity.

Example Embodiments

Onboarding computing devices typically requires interaction and expertise from an administrator to provide the computing device with credentials appropriate for the device context. For instance, different computing devices (e.g., telepresence endpoints, wireless access points, Voice over Internet Protocol (VoIP) telephones, wireless security cameras, printers, etc.) may be provided with different levels of access to an organizational structure (e.g., a company intranet, external network access, etc.). The level and type of access may be dependent on the type of device, as well as other aspects of the device context (e.g., the physical placement, a user or user group assigned to the computing device, etc.). With larger organizations, the number of computing devices that require onboarding may take up a significant portion of the administrators' time with determining the appropriate device context for each device and the appropriate credentials for each device in each device context.

The techniques described herein provide for a secure method for users of a computing device to onboard the computing device with the assistance of an onboarding service. In one simple example, the computing device registers with the onboarding service, which provides an ultrasound token to the computing device. The computing device broadcasts the ultrasound token into the surrounding environment (e.g., the room with the computing device) to signal that the computing device is ready to be onboarded. A user device (e.g., smartphone, laptop computer, etc.) in the room with the computing device detects the ultrasound token and notifies the onboarding service that it detected the ultrasound token, and may provide additional context (e.g., the type of device, the room number, the user's identity, etc.) for the computing device. The onboarding service obtains authorization for the device to onboard into the organizational structure, and provides the computing device with credentials appropriate for that computing device.

Figure 1:
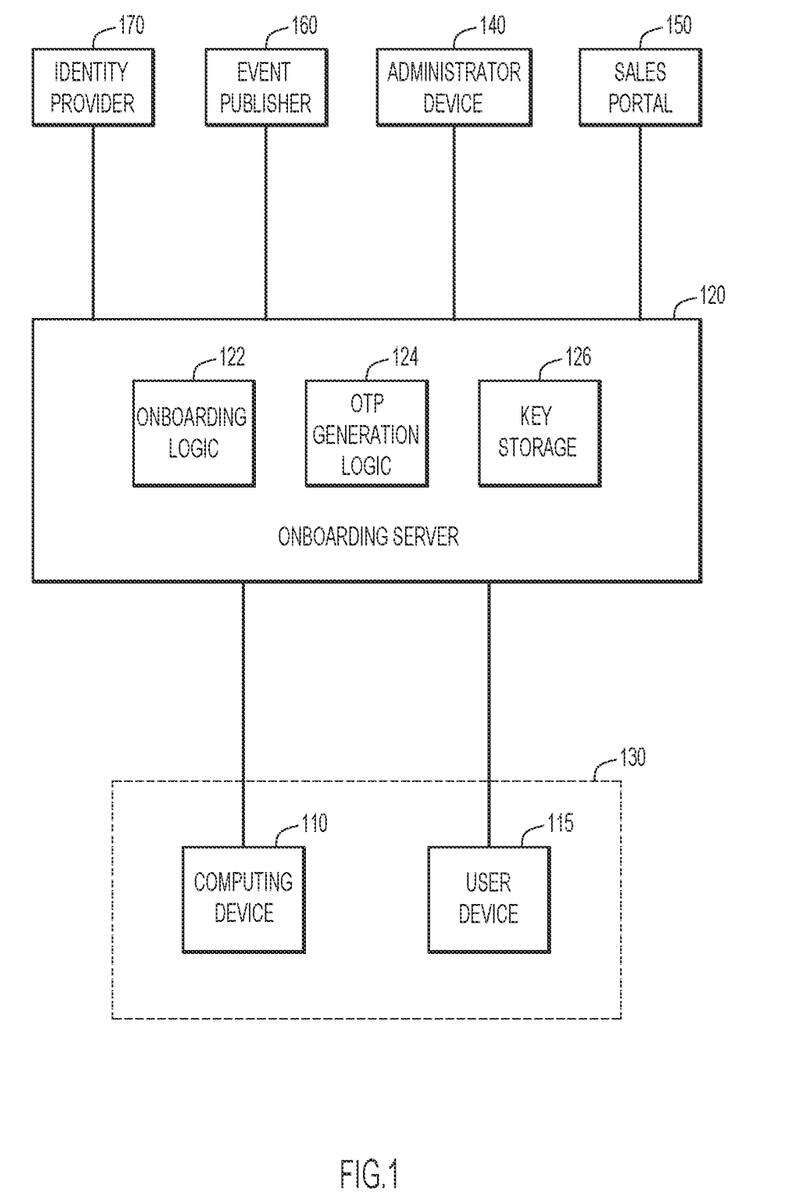
FIG. 1 is a simplified block diagram of an onboarding system configured to configure new computing devices with the assistance of an ultrasound token, according to an example embodiment.

Referring now to FIG. 1, a simplified block diagram illustrates an example of an onboarding system 100 configured to provide credentials to a computing device 110 with the assistance of a user device 115. The onboarding system 100 includes an onboarding server 120 that is connected via a network to the computing device 110 and the user device 115. The onboarding server 120 includes onboarding logic 122, One-Time-Password (OTP) generation logic 124, and key storage 126 configured to enable the onboarding server 120 to perform the techniques described herein. The computing device 110 and the user device 115 are physically located in proximity to each other, such as in a room 130.

The onboarding server 120 is also connected via a network to an administrator device 140, a sales portal 150, an event publisher 160, and an identity provider 170, each of assist the onboarding server 120 with at least one aspect of the onboarding system 100. In one example, the administrator device 140 provides authorization to onboard the computing device 110 and determines the scope of the credentials provided to the computing device 110, as will be described further with respect to FIG. 2. In another example, the sales portal 150 may provide device context (e.g., type of device, owner of the device, capabilities of the device, etc.) that the onboarding server 120 may use to determine the appropriate credentials, as will be described further with respect to FIG. 3. In a further example, the event publisher 160 and identity provider 170 may assist the onboarding server 120 in securely providing the computing device with credentials to onboard into an organizational structure with a particular device identity, as will be described further with respect to FIG. 4.

In one example, the computing device 110 may be a device with limited Input/Output capabilities (e.g., lacking a display or keyboard) that presents challenges to manually entering passwords or activation codes. Alternatively, the computing device 110 may be a device with a full display and input device(s), such as a laptop computer or desktop computer. To participate in the onboarding system 100 described herein, the computing device 110 has a network interface (e.g., a wireless network interface card) and an ultrasound generator to produce the ultrasound token in the room 130.

In another example, the onboarding server 120, the administrator device 140, the sales portal 150, the event publisher 160, and the identity provider 170 may be embodied as one or more computing devices (e.g., servers), and may be provided locally or remotely from the other components of the onboarding system 100.

Figure 2:
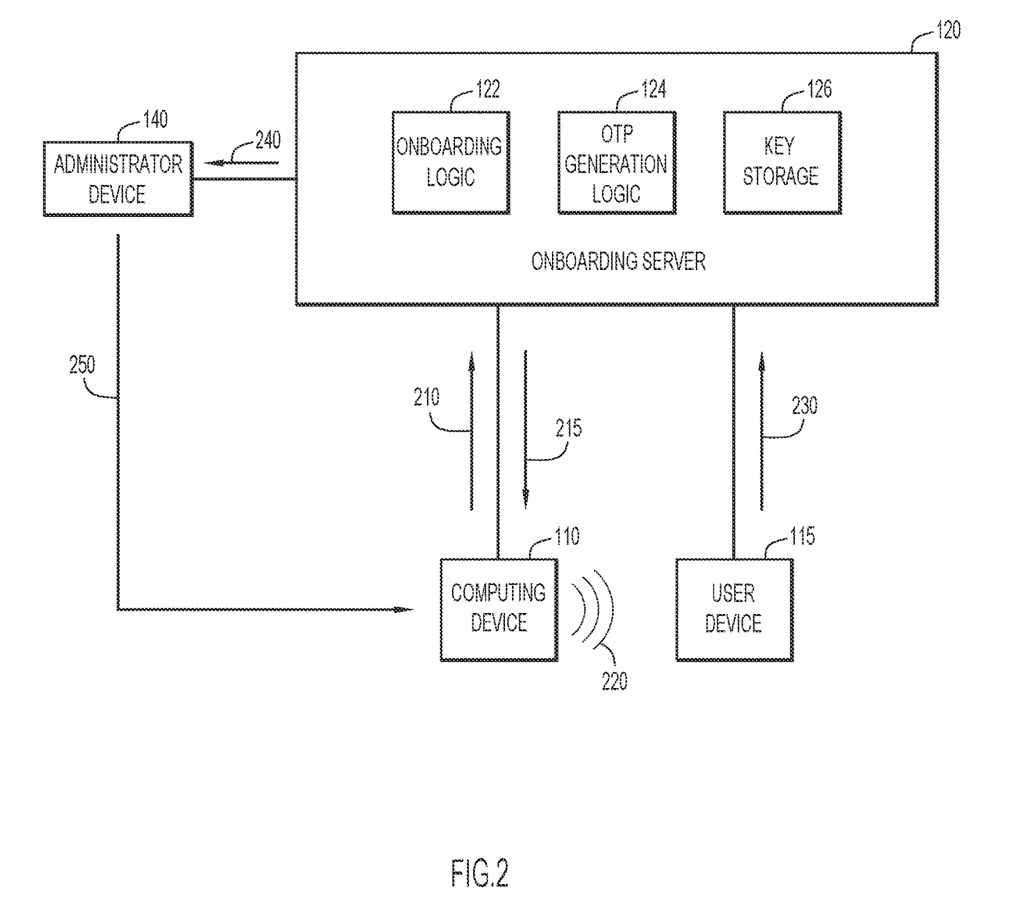
FIG. 2 is a message flow diagram illustrating a computing device being authorized by an administrative device, according to an example embodiment.

Referring now to FIG. 2, an example of onboarding computing device 110 with the approval of administrator device 140 is shown. Initially, the computing device 110 sends a registration 210 to the onboarding server 120. The registration 210 includes an identifier for the computing device 110 and may include a public key for credentials installed by the manufacturer of the computing device 110. The onboarding server 120 receives the registration 210 and stores the public key in the key storage 126, and responds with a registration response 215. The registration response 215 includes a token for the computing device 110 to broadcast in the vicinity of the computing device 110.

The computing device 110 broadcasts the token 220 into the room where the computing device 110 and the user device 115 are located. The user device 115 detects the token 220 and provides a notification 230 to the onboarding server 120. The notification 230 includes the token 220, and may include additional device context for the computing device 110, such as the device type of the computing device 110, the location of the computing device 110, the identity of the user, and/or a suggested device identity for the computing device 110.

The onboarding server 120 correlates the token 220 received from the notification 230 with the notification provided to the computing device 110 in the registration response 215. The onboarding server 120 sends an authorization request 240 to the administrator device 140 of the organization responsible for onboarding the computing device 110. In one example, the onboarding server 120 may provide the device context from the notification 230, as well as any additional device context available to the onboarding server 120, to enable the administrator device 140 to determine the appropriate device identity for the computing device 110.

The administrator device 140 determines that the computing device 110 is authorized to access the organizational structure with a device identity and provides the authorization 250 to the computing device 110. In one example, the administrator device 140 provides the authorization 250 to the onboarding server 120, which forwards the authorization 250 to the computing device 110. The onboarding server 120 may encrypt the authorization 250 with a public encryption key provided by the computing device 110 in the registration 210. Once the computing device 110 receives the authorization 250, the computing device 110 may proceed to authenticate into the resources of the organization. In one example, the authorization 250 may include an activation code that the computing device 110 provides to an identity provider (not shown in FIG. 2) to verify that the computing device is authorized to be configured with a particular device identity.

The authorization 250 may include a One-Time-Password (OTP) based on an administrator's (i.e., a user of the administrator device 140) authentication token. Additionally, the onboarding server 120 may coordinate with an identity provider to generate the authorization 250 with the authorized device identity.

In one example, the token 220 may be a randomly generated token that the computing device 110 broadcasts via ultrasound. Alternatively, the token 220 may be designed for other local communication methods (e.g., light, audible sound, short range wireless protocols, etc.) instead of ultrasound. However, ultrasound broadcast of the token 220 provides higher security and guarantee the user device 115 is in proximity and has access to the computing device 110. For instance, short range wireless protocols typically propagate through walls, and light and audible sound may be detected through windows, allowing a user device 115 that does not have access to the room with the computing device 110 to hijack the onboarding process.

In another example, the computing device 110 may periodically send another registration 210 to the onboarding server 120, and receive another registration response 215 with a new token 220. Rotating the token 220 with periodic registrations allows the token 220 to be time-limited, hindering replay attacks on the onboarding process.

In a further example, the user device 115 may prompt the user to open a particular application when the user device 115 detects the token 220. The application may provide the user with an interface to provide the device context for the computing device 110, and may be used to associate the user identity with the onboarding process as part of the device context.

Figure 3:
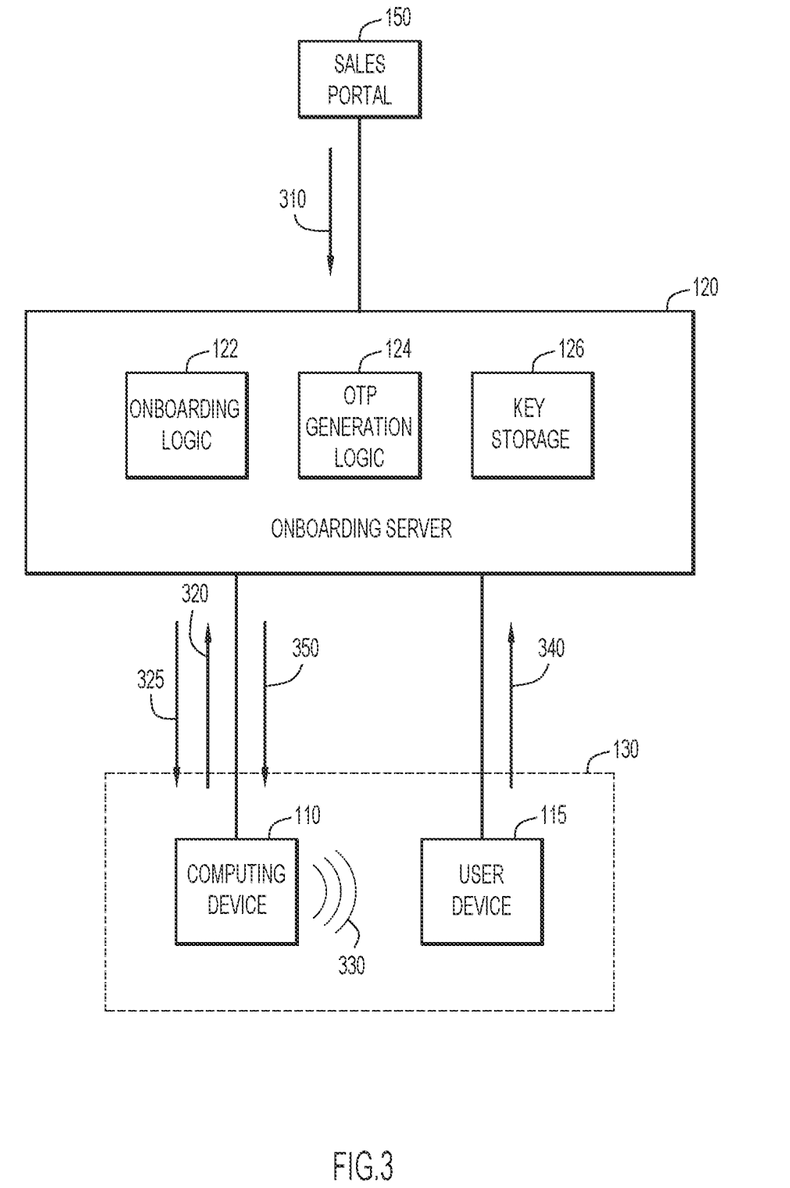
FIG. 3 is a message flow diagram illustrating an onboarding server authorizing a computing device based on information from a sales portal, according to an example embodiment.

Referring now to FIG. 3, an example of automatically onboarding the computing device 110 with the assistance of device context provided by the sales portal 150 is shown. When a customer places an order through the sales portal 150 for the computing device 110 (e.g., a telepresence system, networking device, IoT device, etc.), order information 310 in provided to the onboarding server 120. The order information 310 may include information about the computing device 110 (e.g., type of device, serial number, etc.) and/or information about the customer (e.g., organizational information). The onboarding server 120 may use this information to provide a more seamless and secure onboarding process for the customer, and may ensure that devices that are ordered are being activated and provisioned.

When the customer powers on the computing device 110 at the room/deployment site 130, the computing device provides a registration 320 to the onboarding server 120. In one example, the computing device periodically posts the registration 320 using an anonymous identifier and the public key of a manufacturer installed certificate (MIC). For instance, a networking device (e.g., a Wi-Fi Access Point), may use a Secure Unique Device Identifier (SUDI) certificate stored in a tamperproof storage of the computing device 110. The onboarding server 120 provides a response 325 with a token 330 to the computing device 110 in response to registration 320. The computing device 110 broadcasts the token 330 (e.g., as an ultrasound token) to the local vicinity of the room/deployment site 130.

The user device 115 detects the ultrasound token 330 (e.g., through an application that is open on the user device 115) and sends a notification 340 to the onboarding server 120. The notification 340 includes device context for the computing device 110, and may also include user suggestions for a device name. The device context may include, among other information, the organization of the user, the user identity, map coordinates, and/or a photograph of the computing device 110.

The onboarding server 120 determines and confirms the device identity using the device context provided by the user device 115 and the sales portal 150. Since the sales portal 150 has already provided information regarding the customer organization that purchased the computing device 110, the onboarding server 120 may automatically confirm the device identity for the customer. Alternatively, the onboarding server 120 may require a manual authorization from an administrator of the customer organization to proceed with onboarding the customer device 110 into the customer organization. The onboarding server 120 provides the computing device 110 with an authorization 350 that includes cryptographically secure information to enable the computing device to onboard into the customer organization with the authorized device identity.

In one example, the onboarding server 120 generates a One-Time-Password (OTP)/activation code/initial login credential using the OTP generation logic 124 based on a customer administrator's authentication token. The OTP generation logic 124 may coordinate with an identity provider 170 (not shown in FIG. 3) to generate the OTP for the computing device 110 with the authorized device identity.

In another example, the onboarding server 120 may encrypt the OTP with the public key provided by the computing device 110 in the registration 320. To provide the encrypted OTP to the computing device 110, the onboarding server 120 may store the encrypted OTP and notify the computing device 110 at the anonymous identifier that the encrypted OTP is ready to be downloaded. On receiving the notification that the encrypted OTP is ready, the computing device 110 fetches the authorization 350 with the encrypted OTP from the onboarding server 120, and decrypts the encrypted OTP with the MIC private key. The computing device 110 uses the decrypted OTP to onboard with the appropriate device identity using a typical activation flow.

Figure 4:
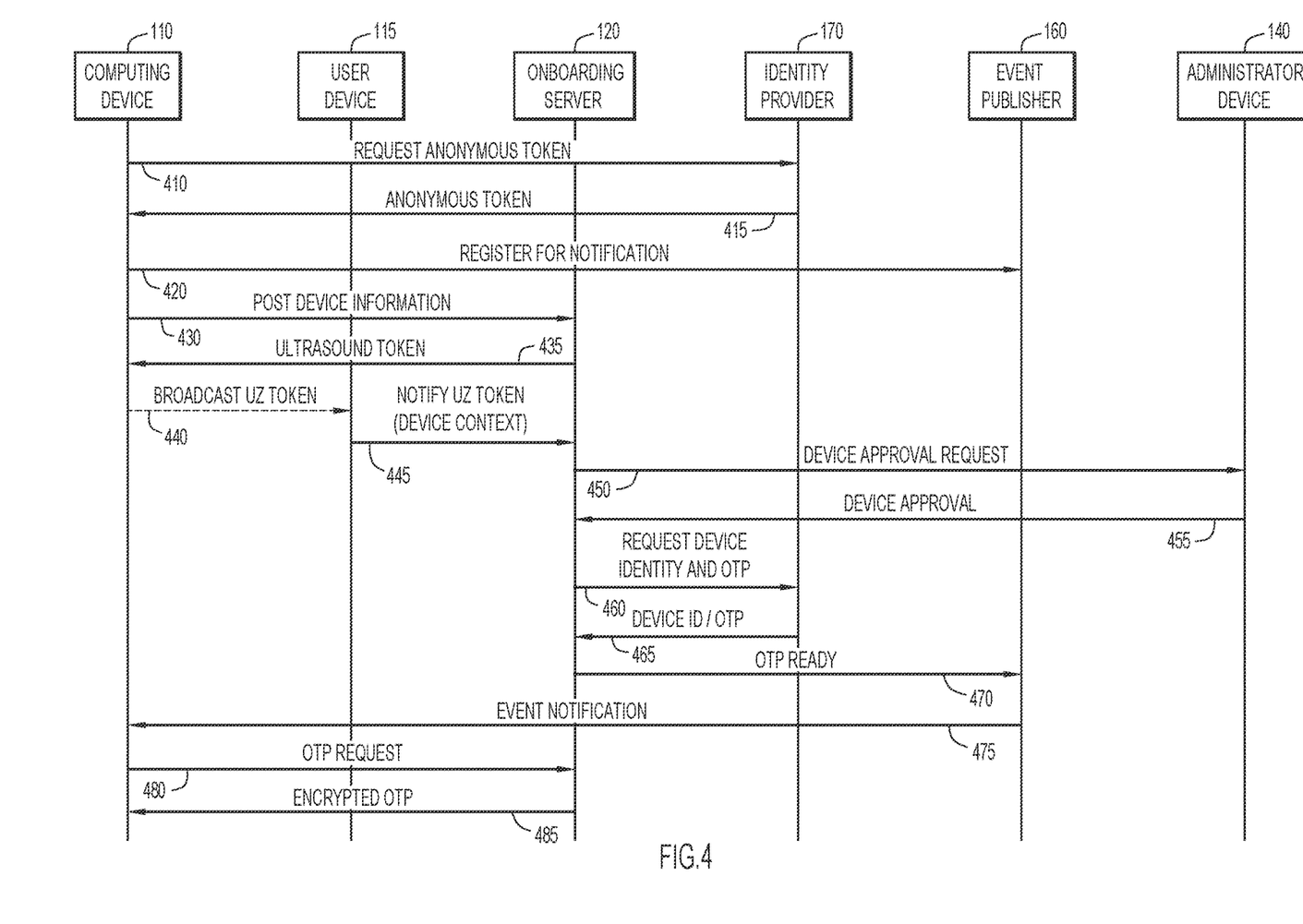
FIG. 4 is a messaging diagram illustrating a computing device obtaining credentials for a device identity to access an organizational structure, according to an example embodiment.

Referring now to FIG. 4, a message flow diagram illustrates messages passed in onboarding a computing device 110 with a device provided by the identity provider 170 with the assistance of the event publisher 160. Initially, the computing device 110 sends a request 410 for an anonymous token to the identity provider 170. In response, the identity provider generates an anonymous token 415 for the computing device 110 to use as an anonymous identifier. In one example, the anonymous token provides a level of privacy and security for the computing device 110. The computing device 110 registers as a listener for events associated with the anonymous identifier by providing an event registration 420 with the anonymous identifier to the event publisher 160. The event publisher 160 is configured to notify the computing device 110 if the event publisher 160 obtains an event associated with the anonymous identifier. Alternatively, the computing device 110 may periodically poll the event publisher to determine if a new event for the anonymous identifier has been received.

The computing device 110 also posts device information to the onboarding server 120 in a registration 430. The device information in the registration 430 may include the anonymous identifier and a public key of a Manufacturer Installed Certificate (MIC). Registering the computing device 110 with the onboarding server 120 using the anonymous token 415 provides an additional level of protection for the onboarding system, e.g., against Distributed Denial of Service (DDoS) attacks. In one example, the MIC protects against a script impersonating as the computing device 110. In response to the registration 430, the onboarding server 120 provides a token 435 to the computing device. In one example, the token 435 may be a randomly generated token that is intended to be broadcast over ultrasound in the vicinity of the computing device 110. The token 435 may be time-limited, and the computing device 110 periodically reposts the registration 430 to refresh the token 435 or obtain a new token 435.

The computing device 110 broadcasts the ultrasound token in a broadcast 440. In one example, the broadcast 440 may be transmitted in any time frame allowed by a bandwidth sharing protocol for ultrasound emissions. In one example, when the computing device 110 transmits the broadcast 440, the computing device 110 may also prompt a nearby user (i.e., the user of user device 115) to open an application on the user device 115. The user device 115 detects the broadcast 440 and provides a notification 445 to the onboarding server 120. The notification 445 includes the token 435 that was in the broadcast 440, and may include additional device context. The device context may include device information automatically provided by the user device (e.g., user identity, user organization, map coordinates, etc.) and/or device information suggested by the user (e.g., a device name or device identity). In another example, the user may be prompted, either by the computing device 110 or the user device 115, to open an application on the user device 115 and provide any available device context.

The onboarding server 120 sends a device approval request 450 to the administrator device 140 to allow an administrator in the onboarding organization to approve the addition of the computing device 110 to the organizational structure. The administrator device 140 provides a device approval 455 to the onboarding server 120. The device approval 455 identifies the scope of the access that the computing device 110 will have in the organizational structure, as well as an authentication token associated with the administrator device 140.

The onboarding server 120 uses the administrator's authentication token to send a device identity request 460 to the identity provider 170 and generate an OTP to authenticate the requested device identity. The identity provider 170 responds to the onboarding server 120 with the OTP 465 that will enable the computing device 110 to authenticate into the organizational structure with the authorized device identity. In one example, the OTP 465 may be time-limited to be valid for a relatively short amount of time (e.g., five minutes).

After the onboarding server 120 receives the OTP 465 from the identity provider 170, the onboarding server 120 may encrypt the OTP 465 with the MIC public key provided by the computing device 110 in the registration 430. Alternatively, the onboarding server 120 may provide the MIC public key to the identity provider 170, which generates the OTP and encrypts the OTP with the MIC public key. In this example, the OTP 465 that the identity provider 170 sends to the onboarding server 120 is encrypted, preventing the onboarding server 120 from reading the OTP 465.

The onboarding server 120 provides a notification 470 to the event publisher 160 indicating that the OTP 465 is ready for the computing device 110 associated with the anonymous identifier to retrieve. The event publisher 160 provides the event notification 475 to the computing device 110 indicating that the OTP is ready.

In response to the event notification 475, the computing device 110 sends an OTP request 480 to the onboarding server 120 to retrieve the encrypted OTP. The onboarding server 120 responds by providing the encrypted OTP 485 to the computing device 110. The computing device 110 uses the MIC private key to decrypt the encrypted OTP 485, and activate itself with the OTP to configure the computing device 110 with the authorized device identity. Once activated, the computing device 110 is able to connect to the organizational structure with the device identity.

Figure 5:
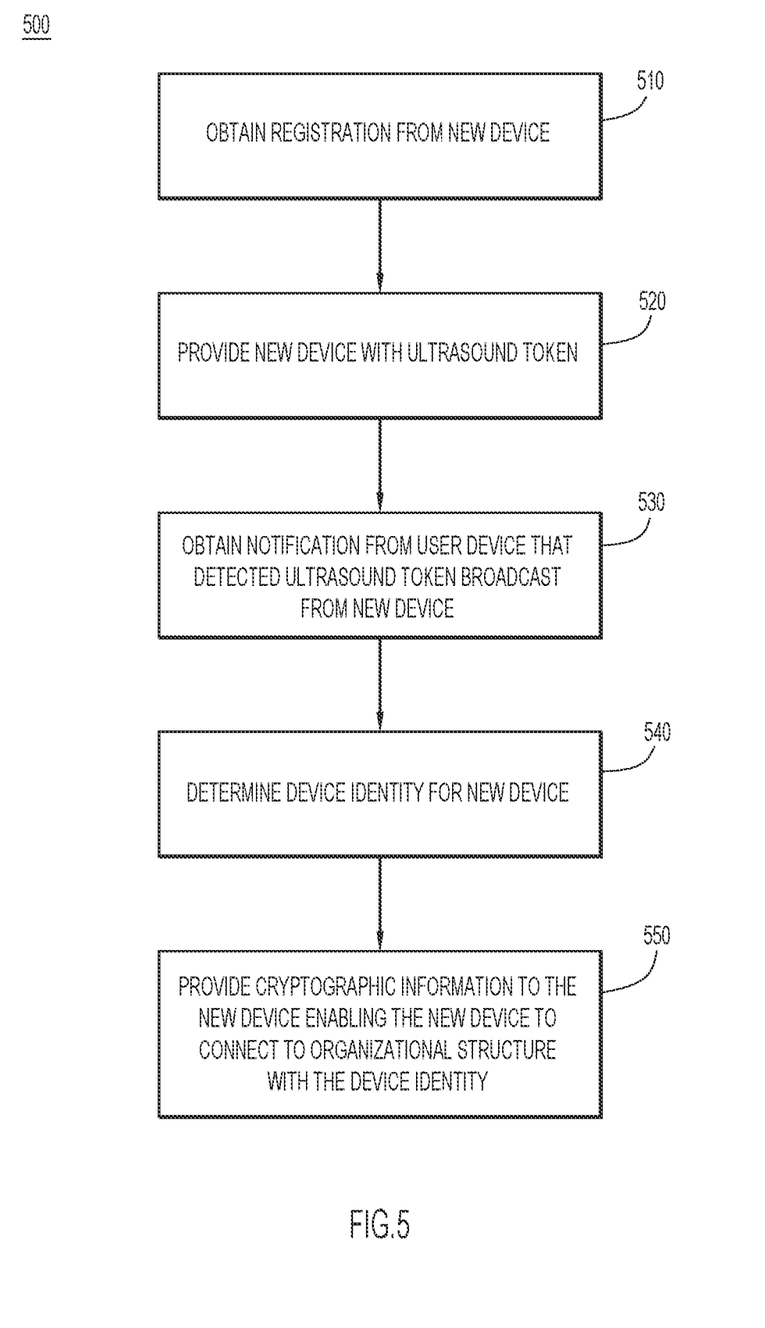
FIG. 5 is a flowchart illustrating operations of an onboarding server for enabling a new device to obtain a device identity that allows the computing device to connect to an organizational structure, according to an example embodiment.

Referring now to FIG. 5, a flowchart illustrates operations performed at an onboarding/enrollment server (e.g., onboarding server 120) in a process 500 to onboard a new device (e.g., computing device 110) into an organizational structure. Initially, the onboarding server obtains a registration from the new device at 510. The registration indicates that the new device is active (e.g., powered on and provisioned with sufficient resources to communicate with at least the onboarding server). In one example, the registration may include an anonymous identifier for the new device and a public key for a credential installed on the new device. In another example, the new device may be a newly manufactured computing device, previously owned but new to the organization, or previously owned by the organization but not currently provisioned with a device identity in the organization. At 520, the onboarding server provides the new device with an ultrasound token to broadcast in the vicinity of the new device. In one example, the new device may periodically send a new registration to obtain a new ultrasound token.

At 530, the onboarding server obtains a notification from a user device that detected the ultrasound token emitted by the new device. In one example, the notification from the user device may include device context for the new device and/or input from the user on appropriate device identity for the new device. At 540, the onboarding server determines a device identity for the new device. In one example, the onboarding server may provide information about the new device (e.g., device context obtained from the user device or from a sales portal) to an administrator device for approval of the device identity.

At 550, the onboarding server provides cryptographic information to the new device enabling the new device to connect to an organizational structure with the device identity. In one example, the onboarding server may notify an event publisher that the cryptographic information is available for the new device to retrieve. The event publisher may notify the new device based on an anonymous identifier associated with the new device, prompting the new device to fetch the cryptographic information from the onboarding server. In another example, the cryptographic information may include an activation code or OTP encrypted with the public key provided by the new device in the registration at 510.

Figure 6:
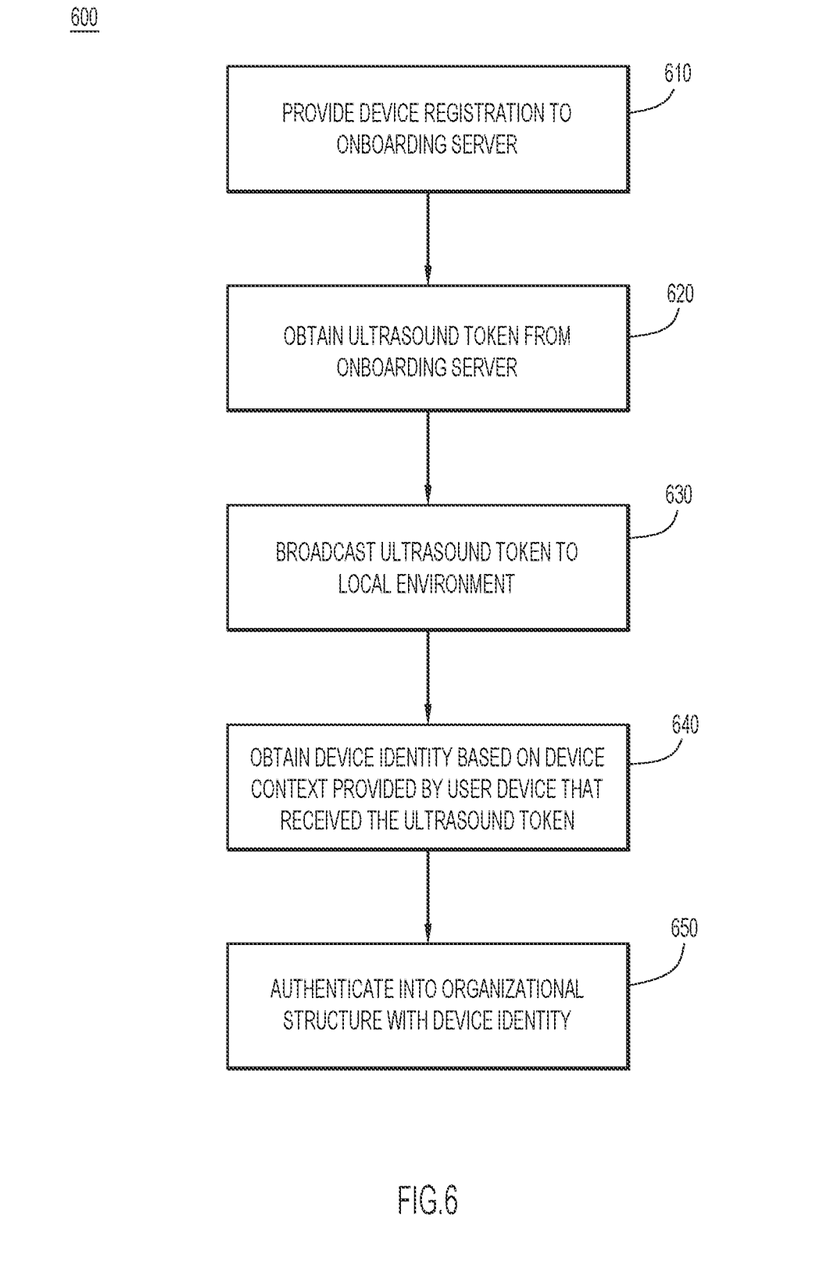
FIG. 6 is a flowchart illustrating operations of a computing device in obtaining a device identity to authenticate into an organizational structure, according to an example embodiment.

Referring now to FIG. 6, a flowchart illustrates operations performed at a computing device (e.g., computing device 110) in a process 600 to onboard the computing device into an organization structure through an onboarding server (e.g., onboarding server 120). At 610, the computing device provides a device registration to the onboarding server. In one example, the device registration may include an anonymous identifier and a public key from a MIC. At 620, the computing device obtains an ultrasound token from the onboarding server. In one example, the computing device may periodically provide a new device registration to the onboarding server to obtain a new ultrasound token from the onboarding server. At 630, the computing device broadcasts the ultrasound token to a local environment surrounding the computing device. In one example, the computing device continues to broadcast the ultrasound token, subject to a bandwidth sharing protocol, to ensure that nearby user devices detect the ultrasound token.

At 640, the computing device obtains a device identity based on device context provided a user device that received the ultrasound token from the local environment of the computing device. In one example, the computing device may obtain the device identity by receiving cryptographic information that enables the computing device to activate with an approved device identity. For instance, the cryptographic information may include an activation code that is encrypted with the MIC public key provided in the registration at 610, and the computing device decrypts the activation code with the MIC private key.

At 650, the computing device authenticates into an organizational structure with the device identity obtain at 640. In one example, the computing device may gain access to additional resources within the organization structure by authenticating with the device identity.

Figure 7:
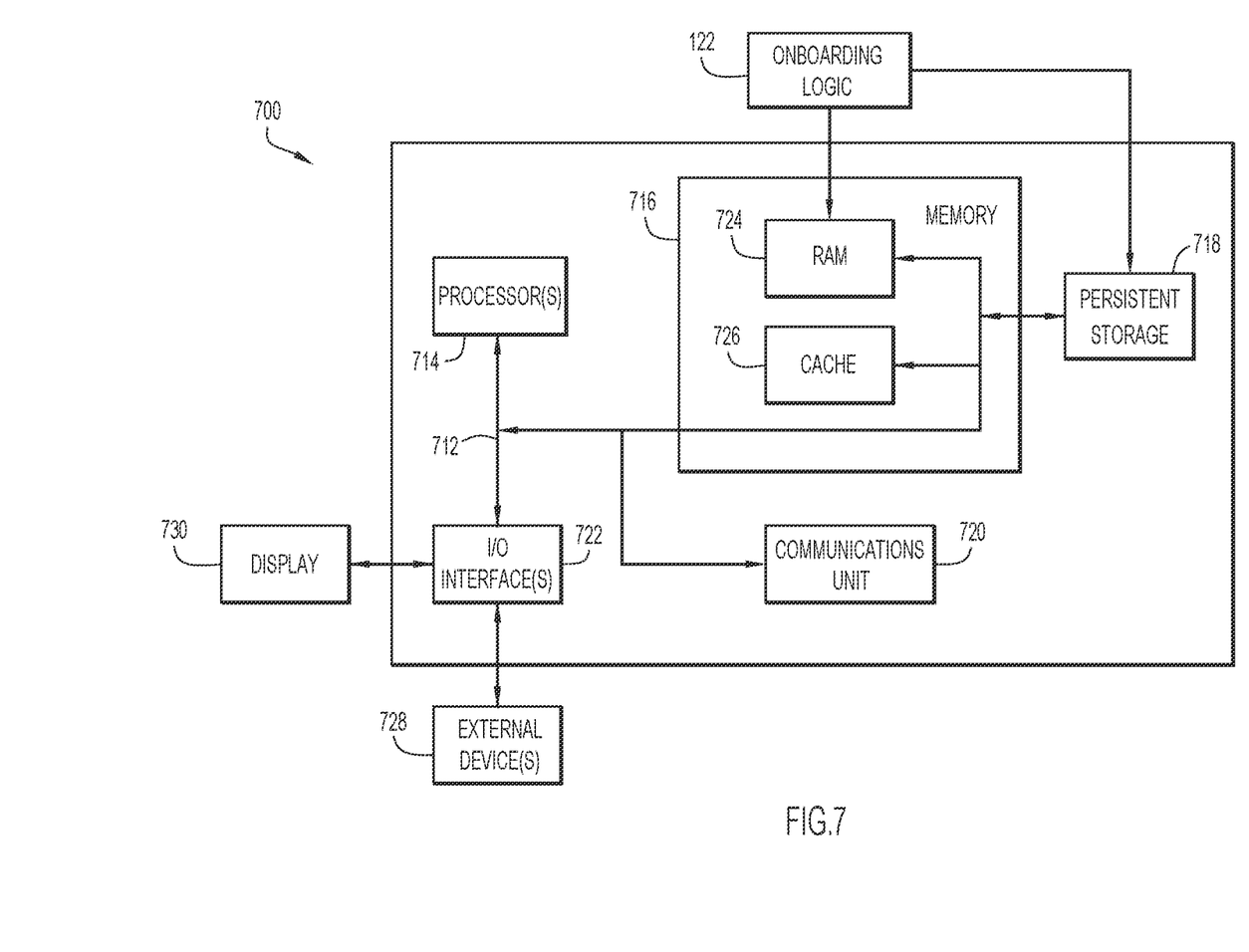
FIG. 7 illustrates a simplified block diagram of a device that may be configured to perform methods presented herein, according to an example embodiment.

Referring now to FIG. 7, a hardware block diagram illustrates a computing device 700 that may perform the functions of any of the servers or computing or control entities referred to herein in connection with the onboarding system described herein. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the onboarding logic 122 may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface units, such as network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein enable onboarding computing devices into an organization using one-time-use activation codes distributed over a side channel, such as ultrasound. The techniques help make device onboarding more simple, seamless, and less error-prone. The ultrasound mechanism ensures that the users are in close proximity to the computing device during the onboarding process. The onboarding system removes the burden for an administrator to configure each new device in the organization, and allows for a user to provide any information necessary to onboard a new device. The onboarding system handles the technical process of securely providing the new device with credentials, enabling an improved user experience for the user of the new device.

In one form, a method is provided for an onboarding server to onboard a new device to an organizational structure. The method includes an onboarding server obtaining a registration from the new device and providing the new device with an ultrasound token. The method also includes obtaining a notification from a user device that detected the ultrasound token broadcast from the new device. The method further includes determining a device identity for the new device and providing cryptographic information to the new device. The cryptographic information enables the new device to connect to an organizational structure with the device identity.

In another form, an apparatus comprising a network interface and a processor is provided. The network interface is configured to communicate with computing devices across one or more computer networks. The processor is configured to obtain a registration from a new device via the network interface and cause the network interface to provide the new device with an ultrasound token. The processor is also configured to obtain via the network interface, a notification from a user device that detected the ultrasound token broadcast by the new device. The processor is further configured to determine a device identity for the new device and cause the network interface to provide cryptographic information to the new device. The cryptographic information enables the new device to connect to an organization structure with the device identity.

In yet another form a non-transitory computer readable storage media is provided that is encoded with instructions that, when executed by a processor of an onboarding server, cause the processor to obtain a registration from a new device and provide the new device with an ultrasound token. The instructions also cause the processor to obtain a notification from a user device that detected the ultrasound token broadcast from the new device. The instructions further cause the processor to determine a device identity for the new device and provide cryptographic information to the new device. The cryptographic information enables the new device to connect to an organization structure with the device identity.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining a registration from a new device;
   providing the new device with an ultrasound token;
   obtaining a notification from a user device that detected the ultrasound token broadcast from the new device;
   determining a device identity for the new device;
   notifying an event publisher that cryptographic information is ready for the new device to retrieve, wherein the new device previously registered with the event publisher to receive event notifications;
   obtaining a request for the cryptographic information from the new device; and
   providing the cryptographic information to the new device, the cryptographic information enabling the new device to connect to an organizational structure with the device identity.

2. The method of claim 1, wherein the registration includes an anonymous identifier and a public key associated with the new device.

3. The method of claim 1, wherein the notification includes device context for the new device provided by the user device.

4. The method of claim 3, wherein the device context includes an indication of a type of device, an indication of a physical location, an indication of a first user associated with the new device, an indication of a second user associated with the user device, or an indication of capabilities of the new device.

5. The method of claim 1, wherein determining the device identity comprises:
   providing device context to an administrative device; and
   obtaining the device identity from the administrative device.

6. The method of claim 1, further comprising:
   obtaining a one-time-password to authenticate the device identity at the new device; and
   encrypting the one-time-password with a public key associated with the new device to generate the cryptographic information.

7. The method of claim 1, further comprising:
   obtaining device information for the new device from a sales portal; and
   authorizing the device identity for the new device based at least in part on the device information from the sales portal.

8. An apparatus comprising:
   a network interface configured to communicate with computing devices across one or more computer networks; and
   a processor coupled to the network interface, the processor configured to:
      obtain a registration from a new device via the network interface;
      cause the network interface to provide the new device with an ultrasound token;
      obtain via the network interface, a notification from a user device that detected the ultrasound token broadcast from the new device;
      determine a device identity for the new device;
      cause the network interface to notify an event publisher that cryptographic information is ready for the new device to retrieve, wherein the new device previously registered with the event publisher to receive event notifications;
      obtain via the network interface, a request for the cryptographic information from the new device; and
      cause the network interface to send the cryptographic information to the new device, the cryptographic information enabling the new device to connect to an organizational structure with the device identity.

9. The apparatus of claim 8, wherein the processor is further configured to obtain an anonymous identifier and a public key associated with the new device from the registration.

10. The apparatus of claim 8, wherein the processor is further configured to obtain device context for the new device from the notification provided by the user device.

11. The apparatus of claim 10, wherein the device context includes an indication of a type of device, an indication of a physical location, an indication of a first user associated with the new device, an indication of a second user associated with the user device, or an indication of capabilities of the new device.

12. The apparatus of claim 8, wherein the processor is configured to determine the device identity by:
   causing the network interface to provide device context to an administrative device; and
   obtaining the device identity from the administrative device via the network interface.

13. The apparatus of claim 8, wherein the processor is further configured to:
   obtain a one-time-password to authenticate the device identity at the new device; and
   encrypt the one-time-password with a public key associated with the new device to generate the cryptographic information.

14. The apparatus of claim 8, wherein the processor is configured to:
   obtain via the network interface, device information for the new device from a sales portal; and
   authorize the device identity for the new device based at least in part on the device information from the sales portal.

15. One or more non-transitory computer readable storage media encoded with instructions that, when executed by a processor of an onboarding server, cause the processor to:
   obtain a registration from a new device;
   provide the new device with an ultrasound token;
   obtain a notification from a user device that detected the ultrasound token broadcast from the new device;
   determine a device identity for the new device;
   notify an event publisher that cryptographic information is ready for the new device to retrieve, wherein the new device previously registered with the event publisher to receive event notifications;
   obtain a request for the cryptographic information from the new device; and
   send the cryptographic information to the new device, the cryptographic information enabling the new device to connect to an organizational structure with the device identity.

16. The non-transitory computer readable storage media of claim 15, further comprising instructions operable to cause the processor to obtain an anonymous identifier and a public key associated with the new device from the registration.

17. The non-transitory computer readable storage media of claim 15, further comprising instructions operable to cause the processor to obtain from the notification, device context for the new device provided by the user device.

18. The non-transitory computer readable storage media of claim 17, wherein the device context includes an indication of a type of device, an indication of a physical location, an indication of a first user associated with the new device, an indication of a second user associated with the user device, or an indication of capabilities of the new device.

19. The non-transitory computer readable storage media of claim 15, further comprising instructions operable to cause the processor to determine the device identity by:
   providing device context to an administrative device; and
   obtaining the device identity from the administrative device.

20. The non-transitory computer readable storage media of claim 15, further comprising instructions operable to cause the processor to:
   obtain a one-time-password to authenticate the device identity at the new device; and
   encrypt the one-time-password with a public key associated with the new device to generate the cryptographic information.

\* \* \* \* \*